(12) United States Patent
Micheloni

(10) Patent No.: US 9,747,200 B1
(45) Date of Patent: Aug. 29, 2017

(54) MEMORY SYSTEM WITH HIGH SPEED NON-VOLATILE MEMORY BACKUP USING PRE-AGED FLASH MEMORY DEVICES

(71) Applicant: Microsemi Solutions (U.S.), Inc., Aliso Viejo, CA (US)

(72) Inventor: Rino Micheloni, Turate (IT)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 0 days.

(21) Appl. No.: 14/322,327

(22) Filed: Jul. 2, 2014

(51) Int. Cl.
*G06F 12/02* (2006.01)

(52) U.S. Cl.
CPC .... *G06F 12/0246* (2013.01); *G06F 2212/205* (2013.01); *G06F 2212/7203* (2013.01); *G06F 2212/7205* (2013.01)

(58) Field of Classification Search
CPC ......... G06F 12/0246; G06F 2212/2022; G06F 2212/202; G06F 2212/205; G06F 2212/7203; G06F 2212/7209; G06F 2212/72; G06F 11/3037; G06F 11/3058; G06F 11/1072; G06F 2212/7205; G11C 7/20; G11C 16/20; G11C 16/10
See application file for complete search history.

(56) References Cited

U.S. PATENT DOCUMENTS

| | | | | |
|---|---|---|---|---|
| 5,537,357 | A * | 7/1996 | Merchant | G11C 16/10 365/185.22 |
| 6,282,135 | B1 * | 8/2001 | Proebsting | G11C 7/065 257/E21.659 |
| 7,539,057 | B2 | 5/2009 | Hwang et al. | |
| 8,301,833 | B1 * | 10/2012 | Chen | G06F 11/1441 710/10 |
| 8,891,308 | B1 * | 11/2014 | Ou | G11C 16/16 365/185.17 |

(Continued)

FOREIGN PATENT DOCUMENTS

EP        1892720 A1 *  2/2008  ......... G11C 11/5628

OTHER PUBLICATIONS

Pan et al., Exploiting Memory Device Wear-Out Dynamics to Improve NAND Flash Memory System Performance, printed on Jul. 2, 2014, Electrical, Computer and Systems Engineering Dept., Rensselaer Polytechinic Institute, Troy, New York, USA.

*Primary Examiner* — Mark Giardino, Jr.
*Assistant Examiner* — Glenn Gossage
(74) *Attorney, Agent, or Firm* — Dennis R. Haszko

(57) ABSTRACT

A memory system having non-volatile memory backup with high-speed programming capability. The non-volatile memory, such as flash memory, is pre-aged before first use in a host system. Pre-aging includes execution of a plurality of dummy program and erase cycles as part of the memory system or before assembly as part of the memory system. The memory system can include an NVDIMM having flash memory backup. The pre-aged flash memory programs a page of data in a shorter period of time relative to new flash memory. Fewer flash memory chips are needed in the memory system relative to memory systems using new flash memory chips, thereby reducing cost of the memory system. The NVDIMM may be used to backup data from a volatile memory device such as a DRAM. Programming times may be tracked after each dummy program/erase cycle, and for each programmable page of a memory block.

27 Claims, 13 Drawing Sheets

(56) References Cited

U.S. PATENT DOCUMENTS

| | | | |
|---|---|---|---|
| 2002/0031012 A1* | 3/2002 | Chen | G11C 16/16 365/185.26 |
| 2003/0074611 A1* | 4/2003 | Nachumovsky | G11C 29/006 714/718 |
| 2008/0084764 A1* | 4/2008 | Pikhay | G11C 17/12 365/185.29 |
| 2011/0286279 A1* | 11/2011 | Lei | G11C 16/3404 365/185.19 |
| 2011/0296079 A1* | 12/2011 | Kotzur | G06F 12/0246 711/103 |
| 2012/0239858 A1* | 9/2012 | Melik-Martirosian | G06F 11/076 711/103 |
| 2013/0086309 A1* | 4/2013 | Lee | G06F 12/0246 711/103 |
| 2013/0141998 A1* | 6/2013 | Jeong | G11C 16/10 365/218 |
| 2016/0211035 A1* | 7/2016 | Shapira | G11C 16/3459 |

\* cited by examiner ns of a figure showing...

MEMORY SYSTEM WITH HIGH SPEED NON-VOLATILE MEMORY BACKUP USING PRE-AGED FLASH MEMORY DEVICES

FIELD

The present disclosure relates generally to data storage devices. More particularly, the present disclosure relates to memory systems with non-volatile memory.

BACKGROUND

Non-volatile memory is a class of data storage in which data stored thereon is retained in the absence of power. Examples include magnetic hard disk drives (HDD) commonly used in computer workstations by example, and non-volatile memory chips commonly used in mobile devices and portable electronic devices such as music players and smart phones by example. A common type of non-volatile memory chip is the flash memory chip. Flash memory chips can be used in any application where data needs to be retained in the absence of power.

Example applications of flash memory chips include NVRAM (non-volatile random access memory), USB (Universal Serial Bus) flash drives and solid state disk drives (SSD), which use one or more flash memory chips to store large amounts of data even when disconnected from a power supply. Another application of flash memory chips is NVDIMM (non-volatile dual in line memory module), which combines both volatile memory such as DRAM (dynamic random access memory) and flash memory on a printed circuit board (PCB). NVDIMM can also be used for RAID (Redundant Array of Independent Disks) adapter cards to cache data in the event of a power outage; they can be used for taking "memory snapshots" where the entire memory contents are captured and stored in the flash memory at pre-determined intervals for mission critical applications; and they can provide an additional layer of tiered memory support with persistence, to store metadata, for databases and on line transaction processing. Other example applications of NVRAM and NVDIMM are not listed here.

One of the well-known problems of flash memory, which extends to NVRAM and NVDIMM which use flash memory, is the time required to program data to the flash memory. For example, the time to write the same amount of data to flash memory can be several times slower than it would take to write to DRAM. By example, the time required to write data to one type of flash memory referred to as single level per cell (SLC) can range between 500 μs to 600 μs, while another type of flash memory referred to as multiple level per cell (MLC) can have longer write times ranging between 1 ms to 1.5 ms. While this may not be an issue in applications where time is not critical, there may be high performance (high speed) applications that demand faster programming times. One example application is using NVDIMM to cache or backup all data of the DRAM in the event of a power failure affecting the host system in which the NVDIMM is connected to and powered from.

FIG. 1A is a block diagram illustrating a generic NVDIMM of the prior art. The NVDIMM of FIG. 1A includes DRAM memory 10, flash memory 12, an NVDIMM controller 14, a switch circuit 16 connected to a PCB (not shown) having conductor traces formed thereon for interconnecting the devices. The memory chips of the DRAM memory 10 and the flash memory 12, as well as the chips of the NVDIMM controller 14 and of the switch circuit 16, are encapsulated in plastic packages. A single flash package can include multiple flash dies connected in parallel with each other. An edge connector physical interface 18 of the PCB is connectable to a slot of the motherboard of the host system. Other devices may be present on the PCB of the NVDIMM, but are not shown in FIG. 1A. It is noted that FIG. 1A shows a single DRAM memory 10 package and a single flash memory 12 package, each representing a collective group of DRAM flash memory packages, as the number of memory device packages depends on the capacity of each memory package and the desired total memory capacity of the NVDIMM.

In normal operation, DRAM memory 10, flash memory 12, NVDIMM controller 14, switch circuit 16, and any other devices, are provided with a regulated voltage MOBO_VR provided from the motherboard. This power can be provided via the edge connector 18 and routed by the PCB conductor traces. In normal operation as shown in FIG. 1A, the DRAM receives write data from the edge connector 18 via switch 16, and provides read data to the edge connector 18 via switch 16. Periodically, the NVDIMM controller 14 checks the status of flash memory 12 to ensure it is working.

FIG. 1B illustrates the interaction of the devices of FIG. 1A in the event of an unexpected power failure. When the host system experiences a sudden loss of power, a backup mode of operation is entered where a backup power supply BACKUP_PWR is immediately activated to provide temporary power to all the devices on the PCB, and a "save" control signal is issued to the NVDIMM controller 14. In response to the "save" control signal, the NVDIMM controller 14 controls switch 16 to decouple the DRAM memory 10 from the edge connector 18, and to couple the DRAM memory 10 to the NVDIMM controller 14, which then issues operations to write all the DRAM data to the flash memory 12.

The problem with this backup operation is that all the data of the DRAM memory 10 must be copied, or written, to the flash memory 12 within a short time span, such as between 25 to 30 seconds for example. It should be noted that this backup time involves at least two components. First is a data transfer time of data from the DRAM memory 10 to the flash memory 12, and second is the internal flash memory programming time which is executed when the flash memory has received the data it is to program. The following example highlights the problem with current NVDIMM's.

If the NVDIMM includes 4 GB of DRAM, then all 4 GB must be copied into Flash memory. Currently the smallest capacity flash memory chip is 4 GB in size and the largest commonly available page size is 16 kB for the 4 GB memory chip, where up to one page of data can be written in one program cycle of the flash memory chip. The page of a flash memory chip is inherent to the device architecture and cannot be increased. It is first noted that the flash memory can be configured to store 2 bits per cell (MLC) or a single bit per cell (SLC). Some MLC flash memory can be configured to operate in an SLC mode. Example worst case MLC program times for one page of data is between 1.3 ms to 1.5 ms. An MLC flash memory chip operating in SLC mode can have worst case program times of about 600 μs. In contrast, worst case SLC program times for one page of data is about 350 μs.

The ideal backup configuration would be to use a single 4 GB flash memory chip to store 4 GB of DRAM data, as this would minimize the number of flash memory chips that is required. However, even the SLC programming times are too slow to achieve programming of all 4 GB within a 30 s time window. Therefore, multiple 4 GB flash memory chips are programmed in parallel to increase the number of pages which can be programmed at substantially the same time. Table 1 below presents different configurations of 4 GB flash memory chips (dies) each having a 16 kB page size, and the corresponding backup time required to backup all 4 GB of DRAM data. These times include the data transfer time from the NVDIMM controller to the flash memories and the internal flash memory programming time.

TABLE 1

| Configuration (Flash type/# of 4 GB die) | Backup time (s) |
|---|---|
| MLC/2-die | 180-200 |
| MLC/3-die | 120-140 |
| MLC/4-die | 100 |
| MLC(SLC mode)/3-die | 60-70 |
| SLC/2-die | 60 |

While MLC flash chips are more cost effective than SLC flash chips of the same storage density, as can be seen from Table 1, even the case of 4 MLC chips operating in parallel would not operate fast enough to program 4 GB of DRAM data within 30 s. It can be seen that additional 4 GB chips operating in parallel are needed in order to attain the desired backup time. However, now the problem of overprovisioning of flash memory is introduced, where the total capacity of the flash memory exceeds that of the DRAM by a significant factor. This undesirably increases cost of the NVDIMM as more flash chips are needed.

It is, therefore, desirable to provide a memory system having non-volatile memory backup with higher speed programming capability at minimal cost.

SUMMARY

In a first aspect, the present disclosure provides a memory system comprising a printed circuit board, a volatile memory device and at least one non-volatile memory device. The printed circuit board has a physical interface configured for connection to a host system. The volatile memory device is connected to the printed circuit board for receiving data from the host system via the physical interface and for providing data to the host system via the physical interface during a first operating mode. The at least one non-volatile memory device is connected to the printed circuit board for receiving and programming data of the volatile memory device during a second operating mode. The at least one non-volatile memory device has a plurality of dummy program/erase cycles executed thereon before the physical interface of the printed circuit board is connected to the host system. According to an embodiment of the present aspect, there is further included a memory controller connected to the printed circuit board and configured to receive the data of the volatile memory during the first operating mode, such that the memory controller can provide the data to the at least one non-volatile memory device. In this embodiment, there is further provided a switch circuit. The switch circuit is connected to the printed circuit board and is configured to connect the volatile memory device to the physical interface during the first operating mode, and to decouple the volatile memory device from the physical interface and to couple the volatile memory device to the memory controller during the second operating mode. In this embodiment, the at least one non-volatile memory device includes at least one NAND flash memory device having memory blocks, where each memory block is configured to have programmable pages arranged from a lowest page number to a highest page number. Furthermore, the memory controller is configured to program data to specific pages of the at least one non-volatile memory device during the second operating mode.

In other different embodiments of the present aspect, the volatile memory device includes at least one DRAM device and the at least one non-volatile memory device includes at least one flash memory device. In another alternate embodiment, the at least one non-volatile memory device includes at least one NAND flash memory device having memory blocks, where each memory block is configured to have programmable pages arranged from a lowest page number to a highest page number. In this alternate embodiment, each page is programmed with valid page data indicating pages which can be programmed during the second operating mode.

In yet further embodiments of the first aspect, the plurality of dummy program/erase cycles is an integer number resulting in a worst case programming time of the at least one non-volatile memory device of less than 350 µs, of less than 300 µs, of less than 250 µs, of less than 200 µs, or of less than 150 µs.

In a second aspect, the present disclosure provides a method for producing a memory system. The method includes providing a printed circuit board having a physical interface configured for connection to a host system; connecting at least one volatile memory device to the printed circuit board; connecting at least one non-volatile memory device to the printed circuit board; and executing a plurality of dummy program/erase cycles on the at least one non-volatile memory device. According to one embodiment of the second aspect, the plurality of dummy program/erase cycles is an integer number resulting in a worst case programming time of the at least one non-volatile memory device of less than 350 µs.

According to another embodiment of the second aspect, the at least one non-volatile memory device includes NAND flash memory each having memory blocks, where each memory block is configured to have programmable pages arranged from a lowest page number to a highest page number. Executing can include tracking programming time after each dummy program/erase cycle, and tracking can include tracking programming times for each programmable page of each memory block. The method can further include tagging each page having a programming time faster than a predetermined time with valid page data information. Alternately, the method can include configuring a memory controller with addresses of pages having a programming time faster than a predetermined time.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 2:
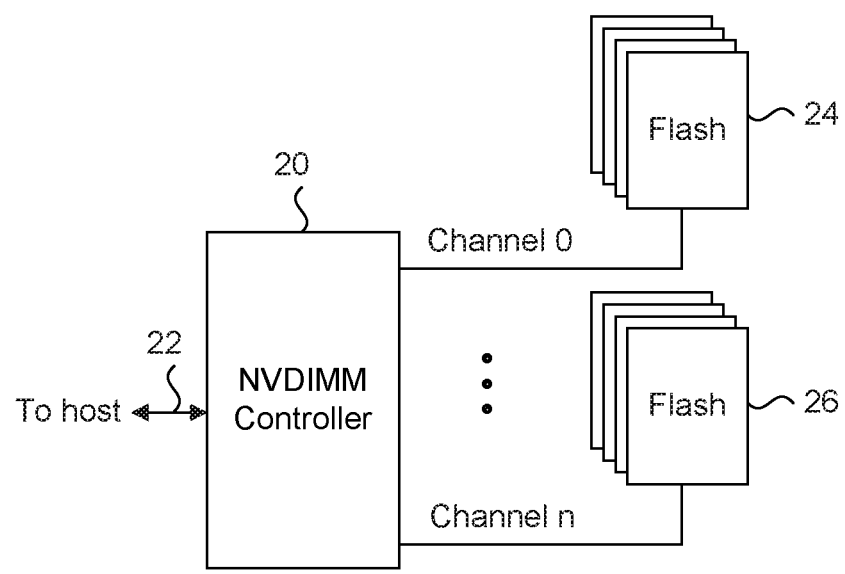
FIG. 2 is a block diagram of an NVDIMM controller connected to a plurality of flash memory devices.

With reference to the previously discussed NVDIMM backup example shown in Table 1, a higher level of parallelism can be employed to attain the desired backup timing of 30 s for all the DRAM data of the NVDIMM. FIG. 2 is a general block diagram of an NVDIMM controller to illustrate this parallelism. The NVDIMM controller operates similarly to a flash memory controller, which is well known in the art.

NVDIMM controller 20 is shown to have a host interface 22, a first channel 0 and a last channel n, where n is an integer number of at least 1. A channel is a collection of signal lines, including for example a data bus of any predetermined width, and other control signals which are commonly used by each of the flash memory chips. Connected to channel 0 is a first group of flash memory chips 24. Connected to channel n is a second group of flash memory chips 26. The flash memory chips 24 are connected in parallel to channel 0, while the flash memory chips 26 are connected in parallel to channel n. This is commonly known as a multi-drop configuration.

In operation, the NVDIMM controller 20 can issue a command, such as a program command followed by program data, to any one of the flash memory chips 24 via channel 0. Since the data bus width (ie. 16 bits wide) is small compared to the page size of a flash memory chip (ie. 16 kB), some time is required before a page of data is received by the selected flash memory chip. Once the flash memory chip has buffered the page of data, it can proceed with an internal program operation. Then channel 0 can be used by the NVDIMM controller 20 for transmitting another program command with another page of data to another selected flash memory chip 24. Accordingly, all the flash memory chips 24 can have overlapping programming operations.

The same programming operations can be initiated in the flash memory chips 26 in parallel via channel n to reduce the total time required to program a large amount of data amongst the flash memory chips 24 and 26. Further total programming time reduction can be achieved by utilizing more channels and the flash memory chips coupled to them. Overprovisioning of flash memory chips increases cost. An NVDIMM controller having greater numbers of channels is more costly than one with less channels. Currently, this is the only known technique for reducing the programming time of data to flash memory, as the flash memory chip vendors do not provide a way to improve programming speed. Furthermore, the programming algorithms for flash memory chips are hard-coded in the logic of the flash memory chip, and therefore cannot be modified or improved either.

In order to improve the programming speed of flash memory chips according to a present embodiment, the flash memory chips can be pre-aged before first use in a host system or the memory system it is a part of. First use can refer to the first time the flash memory chips are booted or powered up for operation in a host system. Those familiar with flash memory understand that each flash memory chip can experience a finite number of program and erase cycles before reliable retention of data is no longer considered valid. In most types of flash memory, it is necessary to erase cells first before programming them with new or updated data. In assembly of an NVDIMM or similar memory system, new flash memory chips are used, which have not experienced any program/erase cycles. This is generally desired, as the lifetime of the flash memory chip is at a maximum before first use in the host system. For example, an MLC flash memory can be rated for about 10 k program/erase cycles, while SLC flash memory is rated for about 100 k program erase/cycles.

Figure 3:
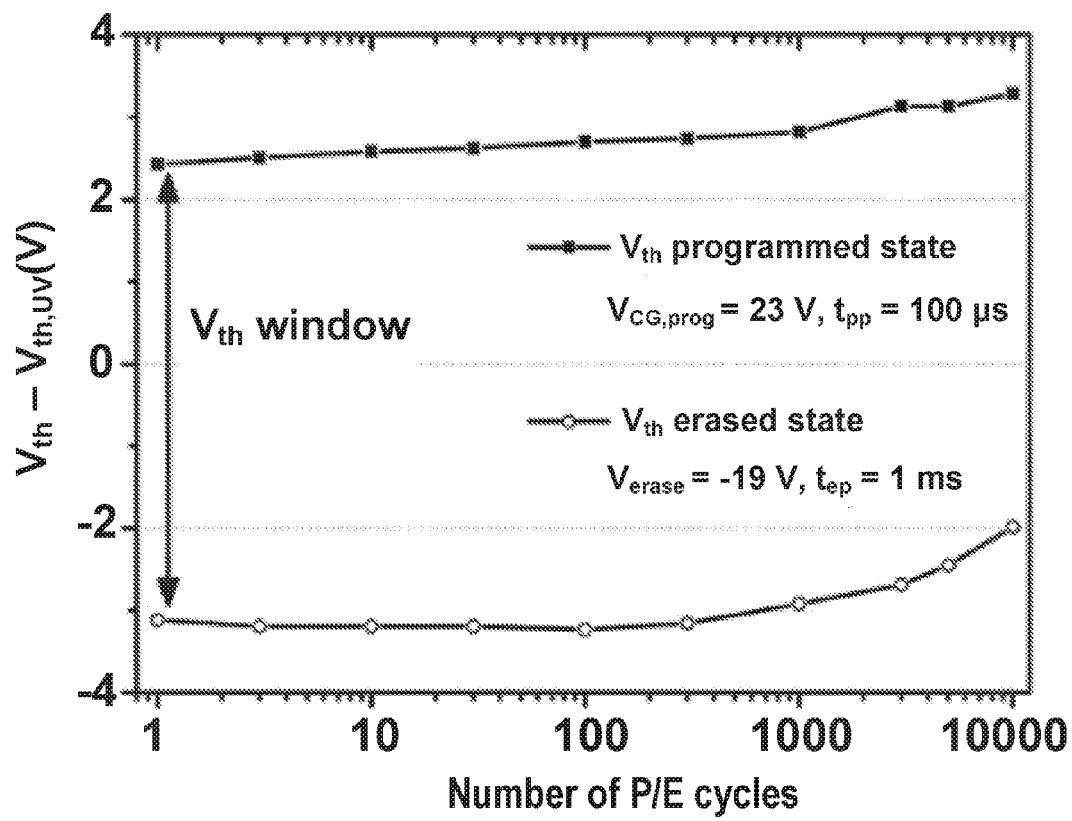
FIG. 3 is a graph showing change in threshold voltage of a NAND flash memory cell versus number of program/erase cycles.

However testing has shown that the time required to program data in flash memory cells progressively decreases as the number of program/erase cycles experienced by the flash memory chip increases. FIG. 3 is a graph plotting experimental results tracking the threshold voltage of a NAND flash memory cell in the erased and programmed states over an increasing number of program/erase cycles. In the example shown in FIG. 3, the erased state of an SLC memory cell is about −3 volts while the programmed state is about 2.5 volts, after being subjected to one program/erase cycle. As the number of program/erase cycles increases, the erase threshold voltage shifts to a less negative value. This change in threshold voltage at the higher number of program/erase cycles translates into a decrease in time for programming the memory cell from the erased state to the programmed state.

Therefore, the present disclosure provides a memory system having non-volatile memory backup with high-speed programming capability which takes advantage of this effect. The non-volatile memory, such as flash memory, is pre-aged before first use in a host system. Pre-aging includes execution of a plurality of dummy program and erase cycles as part of the memory system or before assembly as part of the memory system before first use in a host system. The memory system can include an NVDIMM having flash memory backup. The pre-aged flash memory programs a page of data in a shorter period of time relative to new flash memory. Therefore, fewer flash memory chips are needed in the memory system relative to memory systems using new flash memory chips, thereby reducing cost of the memory system. Pre-aging flash memory on an NVDIMM has minimal impact on the life of the NVDIMM, as power failure events experienced by the host system should be rare and therefore programming to the flash memory is infrequent.

Following is a discussion of pre-aging testing to show the relationship between the number of program/erase cycles and programming speed of a page of data. The testing was performed on an SLC NAND flash memory chip.

Figure 4:
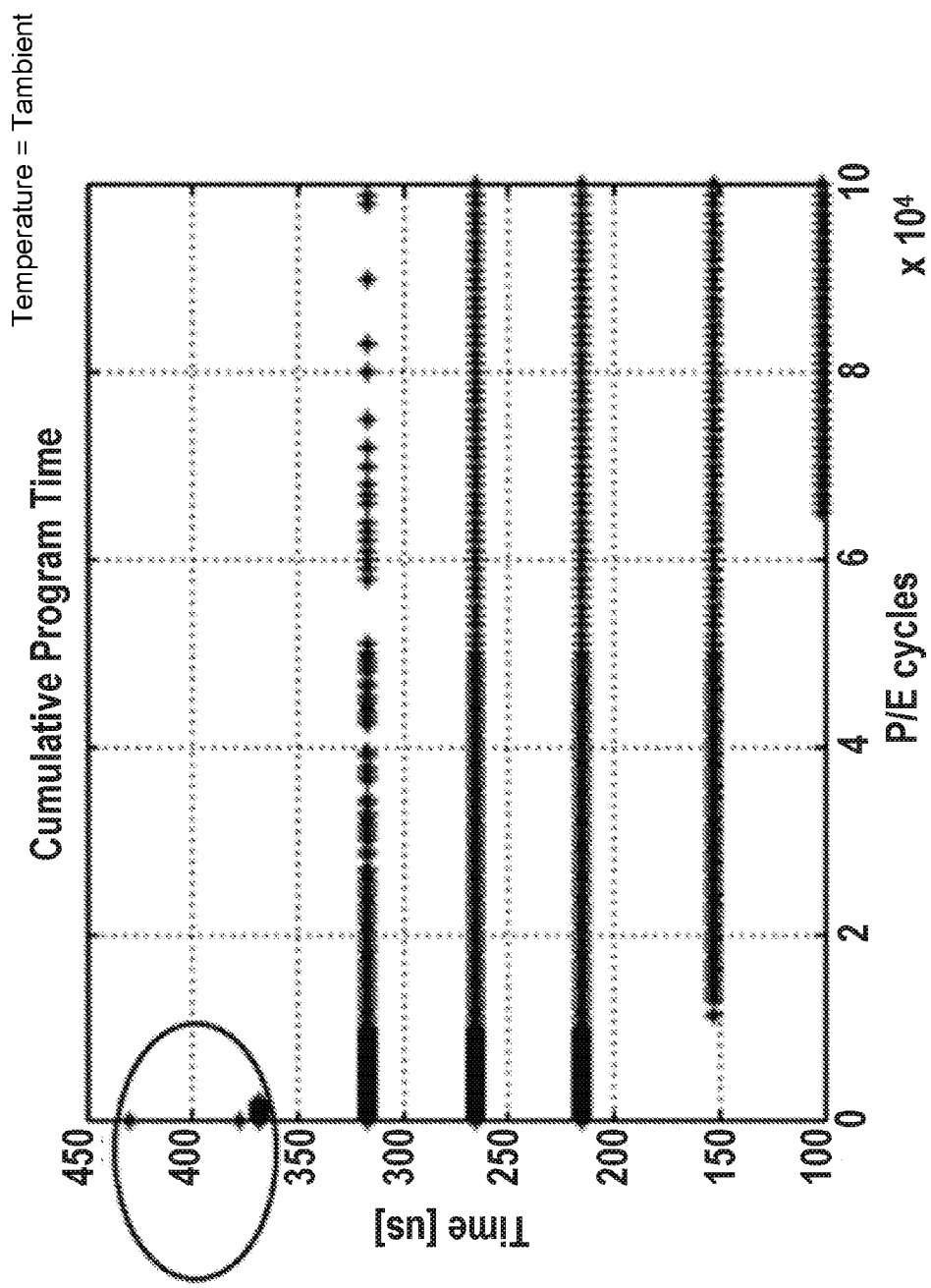
FIG. 4 is a is a graph showing programming time versus number of program/erase cycles at an ambient temperature.
Figure 5:
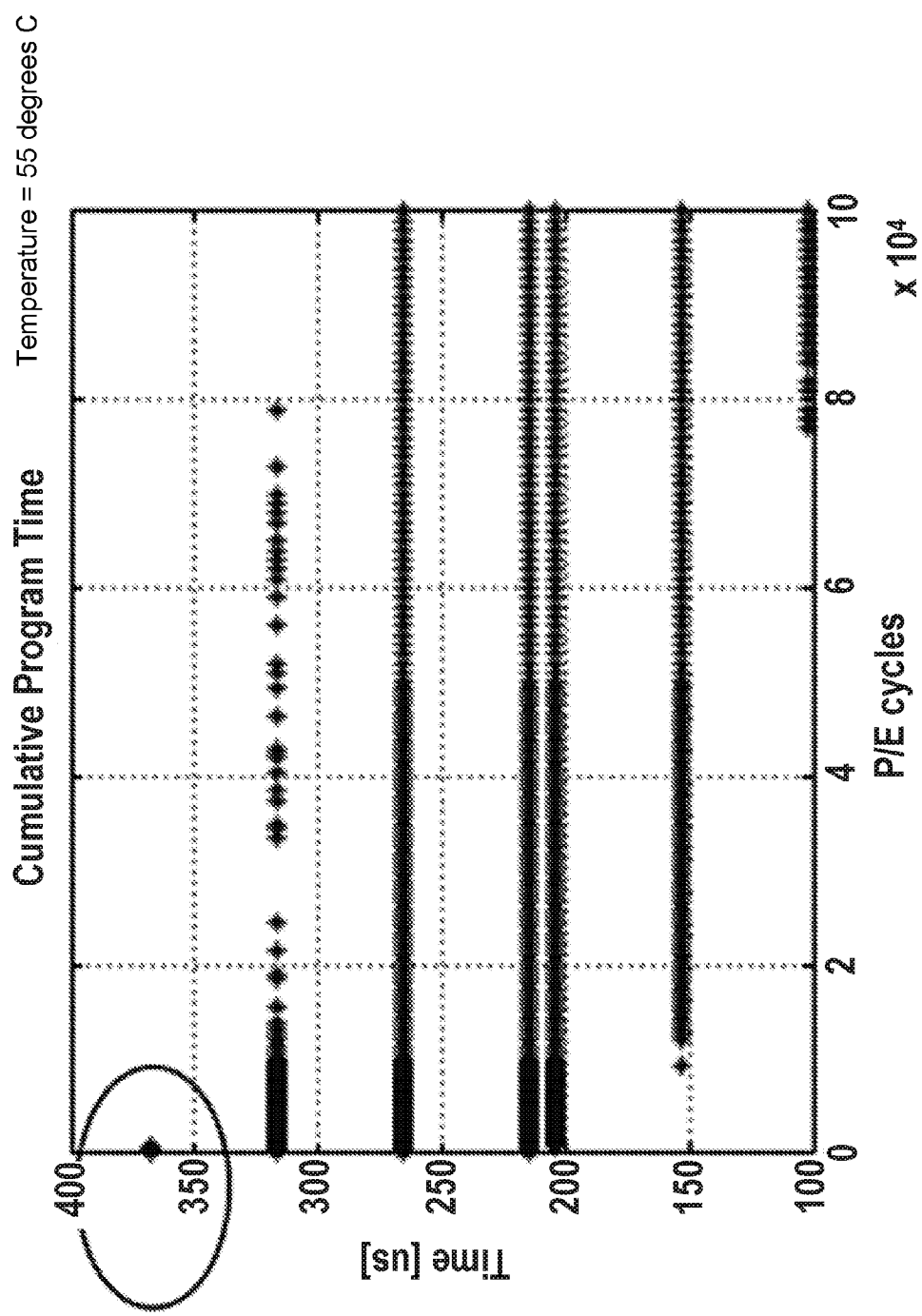
FIG. 5 is a is a graph showing programming time versus number of program/erase cycles at 55 C.
Figure 6:
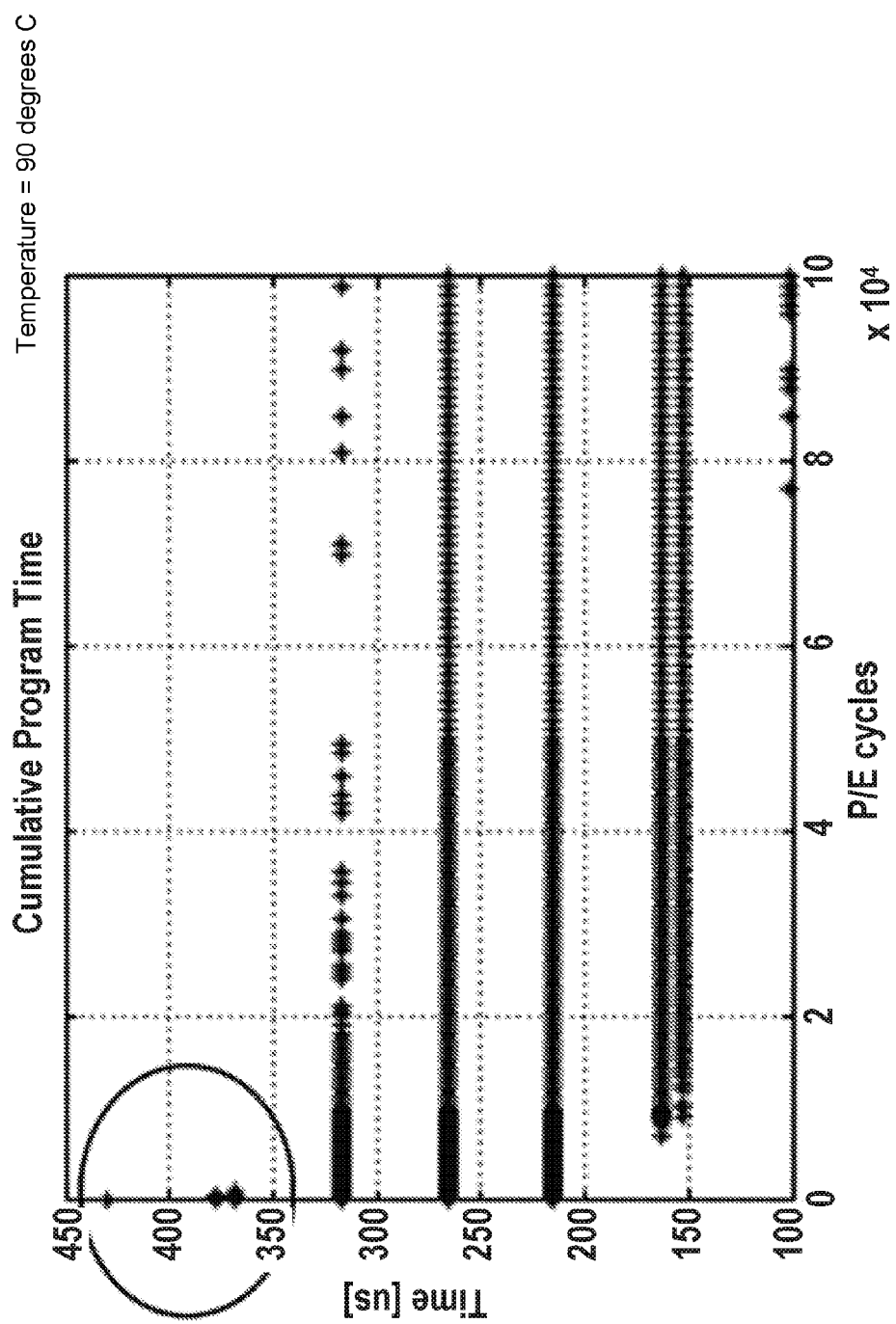
FIG. 6 is a is a graph showing programming time versus number of program/erase cycles at 90 C.

FIG. 4 is a graph plotting programming time of the flash memory chip in is versus the number of program/erase cycles executed in the memory array with the flash memory chip at an ambient temperature. The worst case programming time specified by the flash memory chip vendor is 450 µs. As shown by the circled regions of each graph, some worst case programming times are still within the flash memory chip manufacturer worst case specification. The plotted points show actual programming times for each program/erase cycle. FIGS. 5 and 6 are graphs with the same horizontal and vertical axes as the graph of FIG. 4, except the temperature of the chip is set to about 55 C for the testing shown in FIG. 5 and the temperature of the chip is set to about 90 C for the testing shown in FIG. 6.

The test results from all three graphs clearly shows that after a few thousands of program/erase cycles, the actual program time falls to well below 350 µs, with some program times of about 100 µs. Accordingly, it is advantageous for the NVDIMM application to use pre-aged flash memory chips before first use in the host system.

The three graphs further illustrate that for a different number of program/erase cycles, there are differing programming times. This is due to a topology of the memory array structure, where different memory cells can be programmed faster than other memory cells. For example, as shown in the graphs of FIGS. 4 to 6, there are different programming times for a given number of number of program/erase cycles. Before discussing the dependence of programming time on memory array topology, a brief explanation of the flash memory array topology is first provided. The prevalent type of flash memory is NAND flash memory. The previously shown test results were conducted on NAND flash memory.

Figure 7:
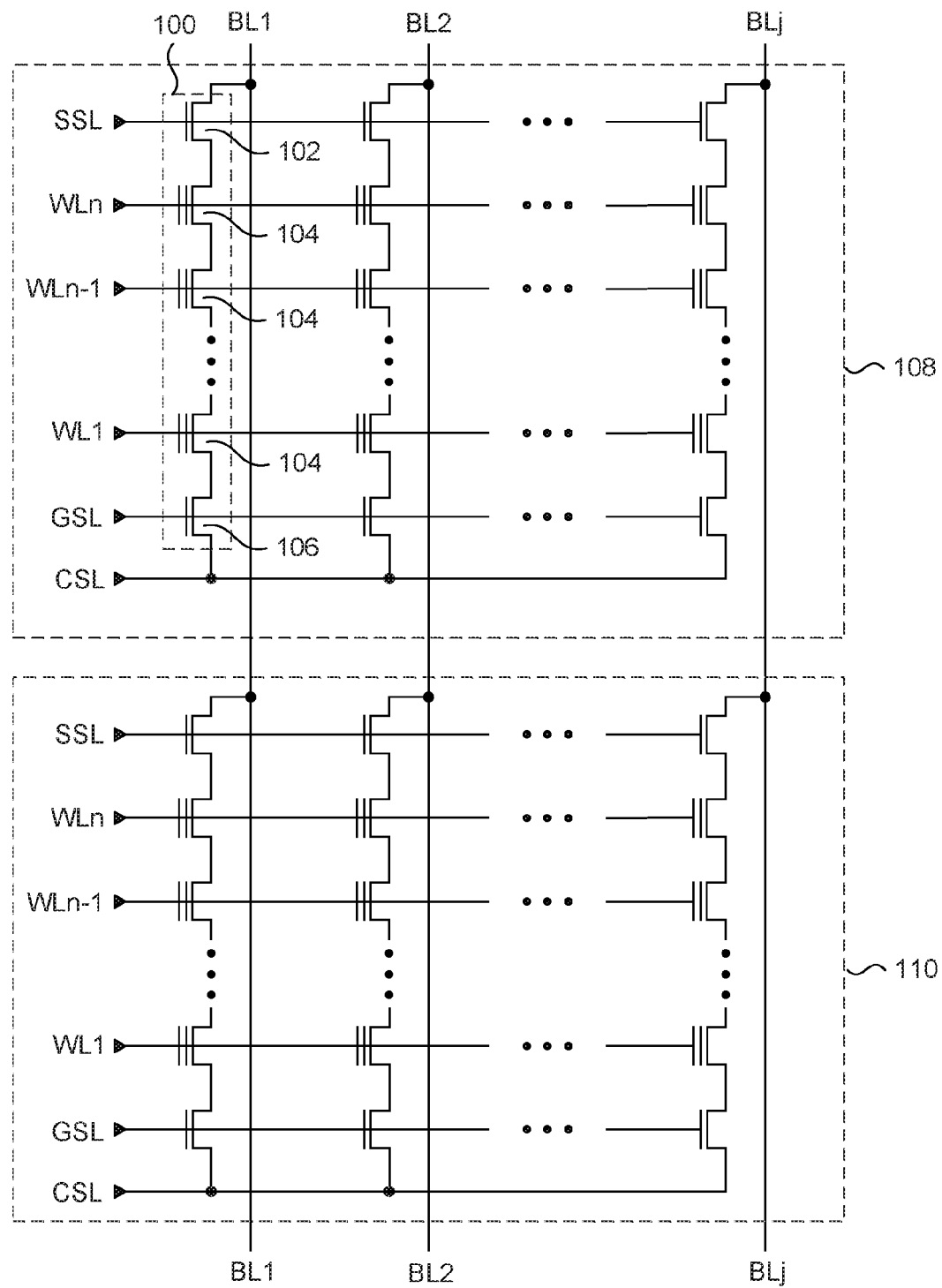
FIG. 7 is a circuit schematic showing circuit details of two memory blocks of a NAND flash memory array.

FIG. 7 is a circuit schematic showing circuit details and the topology of NAND flash memory, which should be well known to persons of skill in the art. NAND flash memory cells are typically arranged as a plurality of memory blocks. The example illustrated in FIG. 7 shows two memory blocks. In FIG. 7, one NAND cell string is outlined with a dashed box 100, which includes a string select device 102, flash memory cells 104, and a source line select device 106 connected in series between bitline BL1 and common source line CSL. There can be "n" flash memory cells 104 per NAND cell string, where "n" is a non-zero integer value indicating the last wordline of the cell string. Accordingly, wordlines WL1 to WLn are electrically coupled to corresponding gates of the flash memory cells 104. A string select line (SSL) and a source select line (GSL) are electrically coupled to select devices 102 and 106 respectively. In the present example, all the transistors of the NAND cell string 100 are n-channel devices.

A memory block 108 includes all the NAND cell strings having select devices and flash memory cells connected to the same wordlines, string select line and source select line. The width of memory block 108 is set by the number of bitlines, which in the case of FIG. 7 is "j" bitlines where j is a non-zero integer value representing a last bitline of the memory array. Memory block 110 includes further NAND cell strings connected to bitlines BL1 to BLj. A bitline and the NAND cell strings electrically connected to it is referred to as a column. All the flash memory cells 104 connected to the same wordline forms a physical page. In MLC flash, each physical page can store k logical pages, where k is an integer number representing the number of bits each flash memory cell 104 can represent. At the present time, MLC is understood to be 2 bits per cell, TLC (triple level cell) is understood to be 3 bits per cell, and QLC (quad level cell is understood to be 4 bits per cell. Future developments may yield cells capable of storing any number of bits per cell. Therefore, each physical page can store more than one logical page of data. For example in the SLC flash memory case, in an even/odd architecture 2 logical pages can be accessed with the same physical wordline. In the MLC case, with even/odd architecture there are 4 logical pages residing on or associated with, the same physical wordline. It should be noted that this is one example logical mapping of pages, and other complex logical-to-physical mapping schemes can be more complex than this (for instance, logic page 0 on wordline0-lower, logic page 1 on wordline1-lower, logic page 2 on wordline0-upper, etc.)

Figure 8:
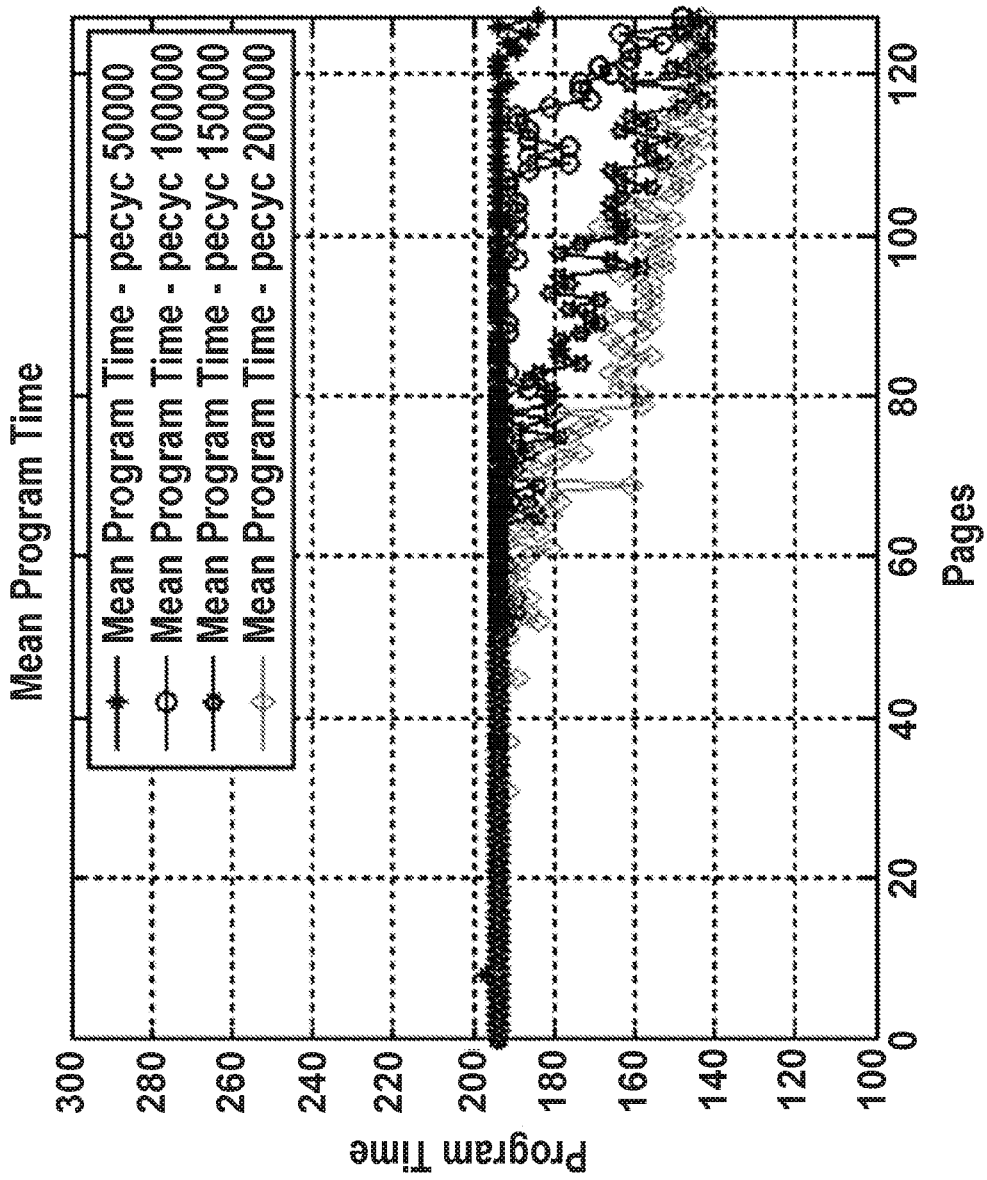
FIG. 8 is a graph showing test results of the effect of pre-aging on the programming time for specific pages of a memory block.

While the graphs of FIGS. 4, 5 and 6 show different reduced programming times as a function of number of program/erase cycles, FIG. 8 is a graph showing further testing results of the effect of pre-aging on the programming time for specific pages of a memory block. In FIG. 8, the horizontal axis represents the logical page number and the vertical axis represents the programming time for programming a logical page of data. FIG. 8 plots tested programming times for all logical page positions of an SLC NAND flash memory chip, at 4 different program/erase states of the memory chip. The first state is at 50 k program/erase cycles, the second state is at 100 k program/erase cycles, the third state is at 150 k program/erase cycles, and the fourth state is at 200 k program/erase cycles. It is clearly apparent from the test results that as the flash memory chip is aged, the higher logical page numbers become faster to program. In fact at 200 k program/erase cycles, logical pages 80 to 120 can be consistently programmed in under 180 µs. With reference to memory block 108 of FIG. 7 by example, WLn can be a last wordline storing logical page 120.

Therefore, cells connected to the wordline closest to the bitline contact, such as WLn, will exhibit the fastest programming times amongst the other cells in the memory block after pre-aging. Conversely, the cells connected to the wordline furthest from the bitline contact, such as WL1, will exhibit the slowest programming times amongst the other cells in the memory block after pre-aging. Accordingly, each memory block has pages with a range of programming times. Therefore a flash memory chip pre-aged with a specific number of program/erase cycles allows the memory system designer to select which pages to use for the particular application or performance constraints.

Therefore, according to a present embodiment, an NVDIMM can be produced to have high speed programming by pre-aging the flash memory before first use of the NVDIMM in a host system.

Figure 9:
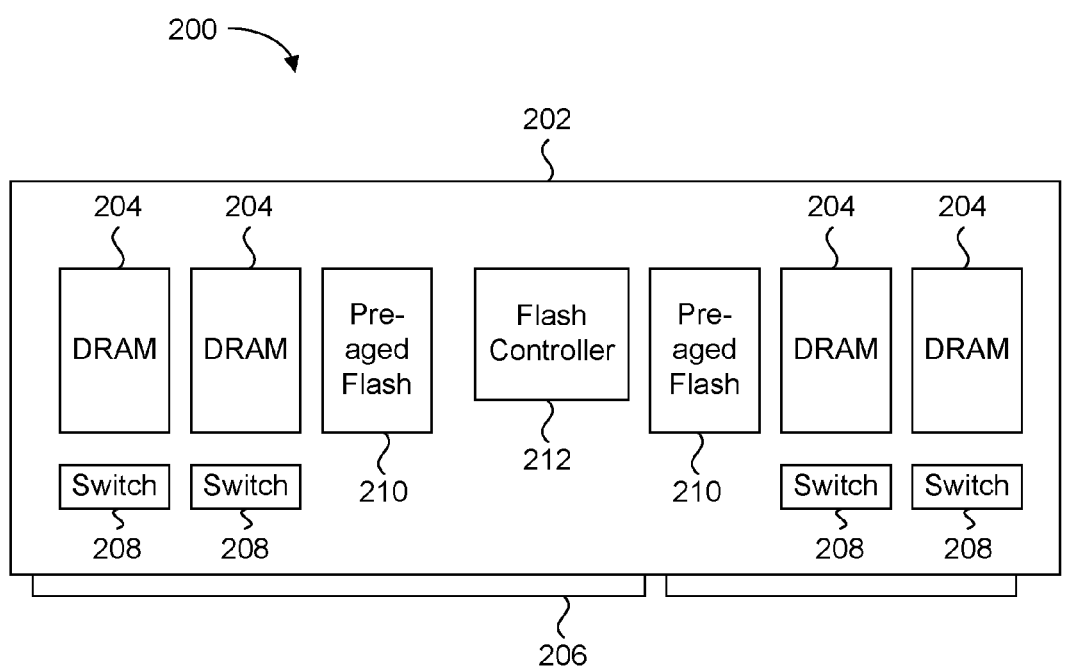
FIG. 9 is an illustration of an NVDIMM with high speed programmable NAND flash memory, according to a present embodiment.

FIG. 9 is an illustration of an NVDIMM with high speed programmable NAND flash memory, according to a present embodiment. The devices and the dimensions of the NVDIMM are not drawn to scale, and not all components necessary for proper operation of the NVDIMM, such as passive devices for example, are shown. NVDIMM 200 of FIG. 9 includes a PCB 202 with signal conductor lines and connectors for all packaged devices (not shown). DRAM chips, which are packaged DRAM devices 204, are electrically connected to the PCB 202. These can be the same as DRAM memory 10 shown in FIGS. 1A and 1B. The packaged DRAM devices 204 provide read data to and receive write data from signal lead terminals formed on edge connector 206 via a respective switch circuit 208 electrically connected to the PCB 202. The edge connector 206 can be the same as edge connector 18 shown in FIGS. 1A and 1B, while the switch circuits 208 are collectively represented by the switch 16 shown in FIGS. 1A and 1B. Flash chips, which are packaged flash devices 210, are electrically connected to the PCB 202. It is noted that the total number of DRAM devices 204 and flash devices 210 are not accurately shown in the embodiment of FIG. 9. Each flash device 210 is connected to a flash controller 212 electrically coupled to the PCB 202, where the flash controller 212 receives data from the switch circuits 208 in the backup mode of operation. The flash controller can be the same as the NVDIMM controller 14 shown in FIGS. 1A and 1B. The data path between the DRAM devices 204, switch circuits 208, the flash controller 212 and the flash devices 210 is the same as that shown in FIG. 1B.

Figure 1A:
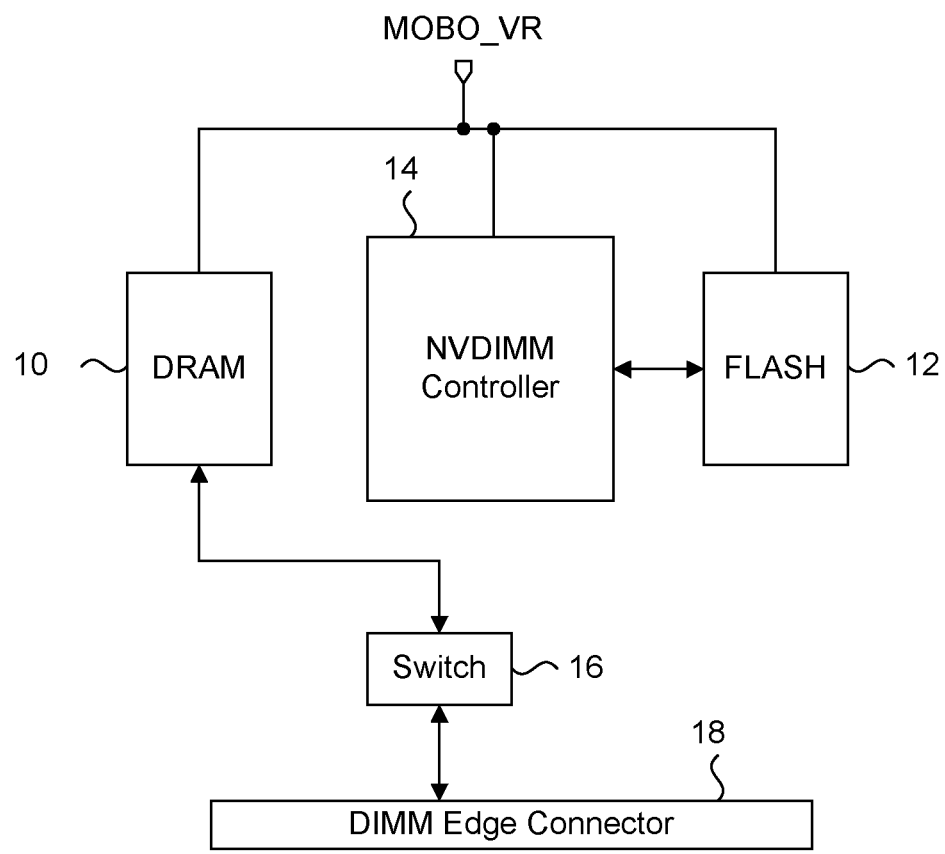
FIG. 1A is a block diagram illustrating a prior art NVDIMM operating in a normal mode.
Figure 1B:
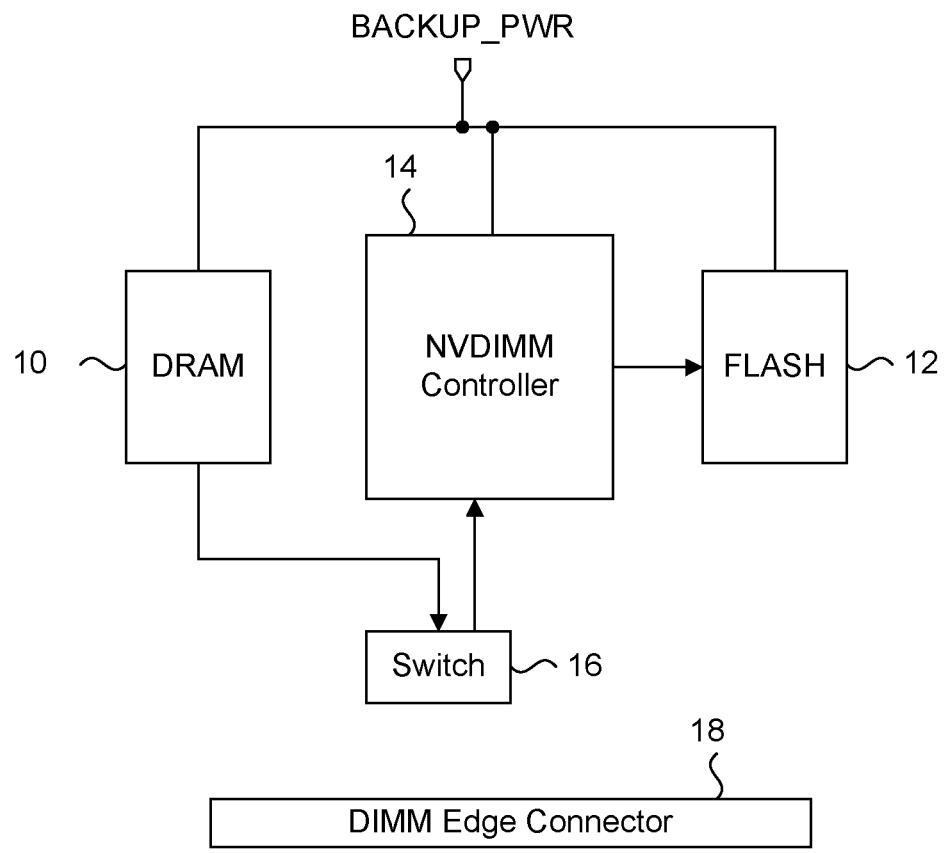
FIG. 1B is a block diagram of the NVDIMM of FIG. 1A operating in a backup mode.

While the NVDIMM 200 of FIG. 9 has the same function as the NVDIMM of FIGS. 1A and 1B, the flash devices 210 are not new flash devices. According to the present embodiment, flash devices 210 are pre-aged such that many program/erase operations have already been executed by the flash devices 210. The assembled NVDIMM 200 of FIG. 9 with the pre-aged flash devices 210 has never been used in normal operations in a host system. Therefore upon first use in a host system, the first backup operation that is required for the NVDIMM 200 will be executed at high speed. In other words, the data of all the DRAM devices 204 will be copied to the flash devices 210 more quickly than possible if the flash devices 210 were new devices having no pre-aging.

As will be discussed later, the flash controller 212 can be configured after pre-aging and before the first use in a host system to program pages of data to a specific range of physical/logical pages in each memory block of the flash devices 210. As previously shown in FIG. 8, certain logical pages of the flash memory device can be programmed with a worst case higher speed after a specific number of program/erase cycles have been executed.

Figure 10:
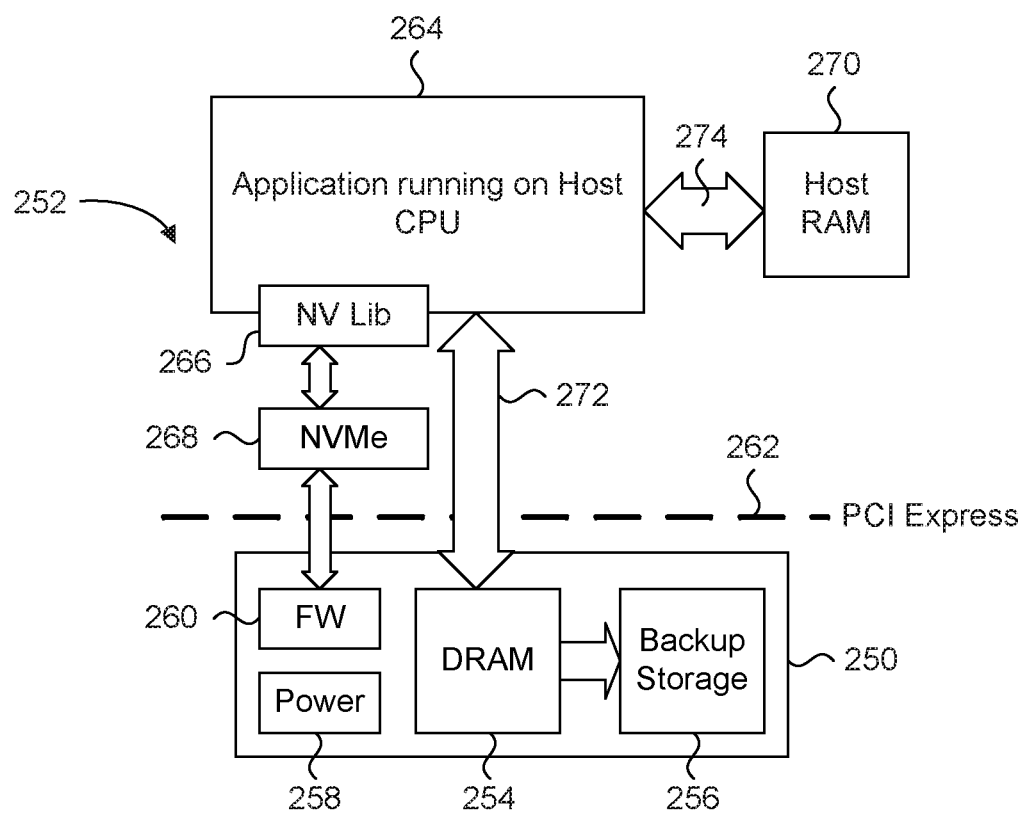
FIG. 10 is a block diagram of an NV-RAM with high speed programmable NAND flash memory with a host system, according to a present embodiment.

The use of pre-aged flash devices is not limited to the NVDIMM application shown in the embodiment of FIG. 9. Other applications in which backup of data stored in volatile memory is required can benefit from the pre-aging of flash devices. FIG. 10 is a block diagram of an NV-RAM (non-volatile random access memory) 250 with high speed programmable NAND flash memory used in a host system 252, according to a present embodiment. NV-RAM 250 can include a PCB having attached thereto DRAM devices 254, backup storage devices 256, a temporary power supply 258 such as a capacitor or a battery, and firmware (FW) 260. The PCB is less constrained in size than the NVDIMM, and therefore has a larger overall storage capacity. The PCB can have a connector configured as a PCI (Peripheral Component Interconnect) type interface 262, such as PCI Express, for insertion into a PCI slot of the host system 252. In the present embodiment, the backup storage devices 256 are flash devices that are pre-aged before first use in the host system 252 such that they can be programmed with higher speed than new flash devices.

The host system 252 typically includes an application 264 running on the CPU (central processing unit) of the host system, which may include a non-volatile library 266, a non-volatile memory express (NVMe) controller interface 268, and host random access memory 270 such as DRAM. Not all parts of the NV-RAM 250 and host system 252 are shown in FIG. 10 in order to simply the drawing, however persons skilled in the art understand that other components may be necessary for proper operation. Generally, the application 264 can access the NV-RAM 250 via a direct memory interface 272, and can access the host random access memory 270 via a DDR (double data rate) or other similar interface 274. The configuration shown is an example of memory mapped access with byte level resolution where the DRAM 254 is mapped to the CPU address space. In this configuration, the application 264 can use memory semantics (load/store) and DMA engines access DRAM 254. In the event of unexpected host system power loss, the temporary power supply 258 provides power to the NV-RAM 250, and the contents of DRAM 254 are written at high speed to the pre-aged flash backup storage devices 256.

The NV-RAM 250 shown in FIG. 10 is an example of one type of access configuration with a host system. Other types of access configurations are known, such as block based access with the host system. In such an alternate configuration by example, an NVMe interface is used, buffers are stored in the DRAM 254, and applications use storage semantics (open/write/read) to access the DRAM 254 in fixed block groups.

Figure 11:
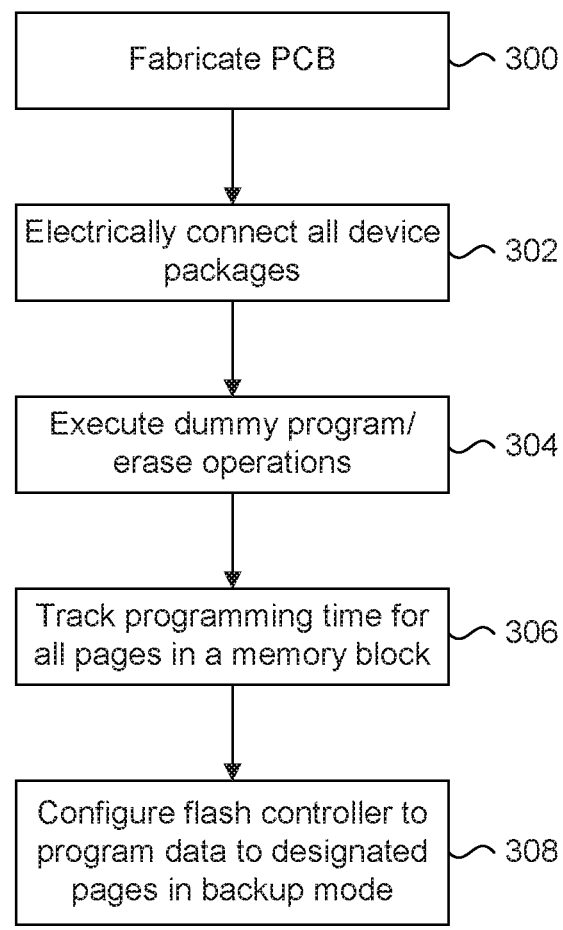
FIG. 11 is a flow chart of a method for producing an NVDIMM having high speed flash memory backup capability, according to a present embodiment.

FIG. 11 is a flow chart of a method for producing an NVDIMM having high speed flash memory backup capability, according to a present embodiment. The method starts at 300 where the PCB is fabricated to include all the required conductor line traces to interconnect devices and to provide the physical interface to the host system, such as a keyed shape of the edge connector to fit within a corresponding female slot of the host system. At 302, all device packages, such as the DRAM devices, flash devices and the flash memory controller, are connected to the PCB at their predetermined locations. More specifically, the bond pads and solder bumps of the packaged devices are electrically bonded to the PCB. At this point, the NVDIMM should be fully functional. Following at 304, the NVDIMM can be inserted into a tester, such as a dedicated test setup or test host system configured to execute predefined test routines.

At 304, the tester controls the NVDIMM to execute dummy program/erase cycles. For example, the NVDIMM can have special test modes accessible by the NVDIMM manufacturer through a special command issued to the flash controller. The flash controller then repeatedly programs dummy data to each page of each memory block of the flash devices, and then erases each memory block. The data pattern of the dummy data can be an alternating checkerboard, all 1's (erased state is logic 0) or any other suitable test pattern. This can be considered one program/erase cycle. This can be done for each memory block of the flash device. To minimize the time to pre-age the flash devices, not all the memory blocks of the flash devices need to be subjected to dummy program/erase cycles. Since there may already be overprovisioning of flash memory devices, only certain memory blocks of each flash device need to be subjected to the dummy program/erase cycles. The specific number of program/erase cycles to execute at 304 can be preset based on pre-testing of the same flash memory vendor device model, which has established worst case high speed programming times for specific logical pages. Alternately, a lower range of a number of program/erase cycles can be set based on the percentage improvement in worst case programming speed that is required, as different flash devices may require a different number of program/erase cycles to get the desired minimum programming speed improvement over the flash vendor worst case specification. Reference is made to FIG. 8 which shows the different logical page numbers that exhibit different programming times.

Alternately, the number of program/erase cycles can be monitored with tracking of program speed of each logical page being programmed. Once the desired worst case high speed programming time for a range of logical pages is reached, then the program/erase cycling can end. Any scheme or system for tracking programming time for the pages of a memory block can be done as part of step 306 of FIG. 11. At 308, the flash controller is configured to know which logical pages should be used for programming data in a backup operation mode. More specifically, the flash controller is configured to have the physical page addresses which should be used for programming data. Alternately, since most flash memory allocates additional bits for each page of data, the flash controller can tag the logical pages that are to be used for programming data in the backup operation mode. This can be referred to as valid page data, as invalid pages are not used for programming data. Then when the NVDIMM is used for the first time in the host system, the flash controller can scan the flash memory additional bits to log the pages to be used for programming as part of a boot up sequence. After 308, the NVDIMM is ready to be used for the first time in a host system.

Figure 12:
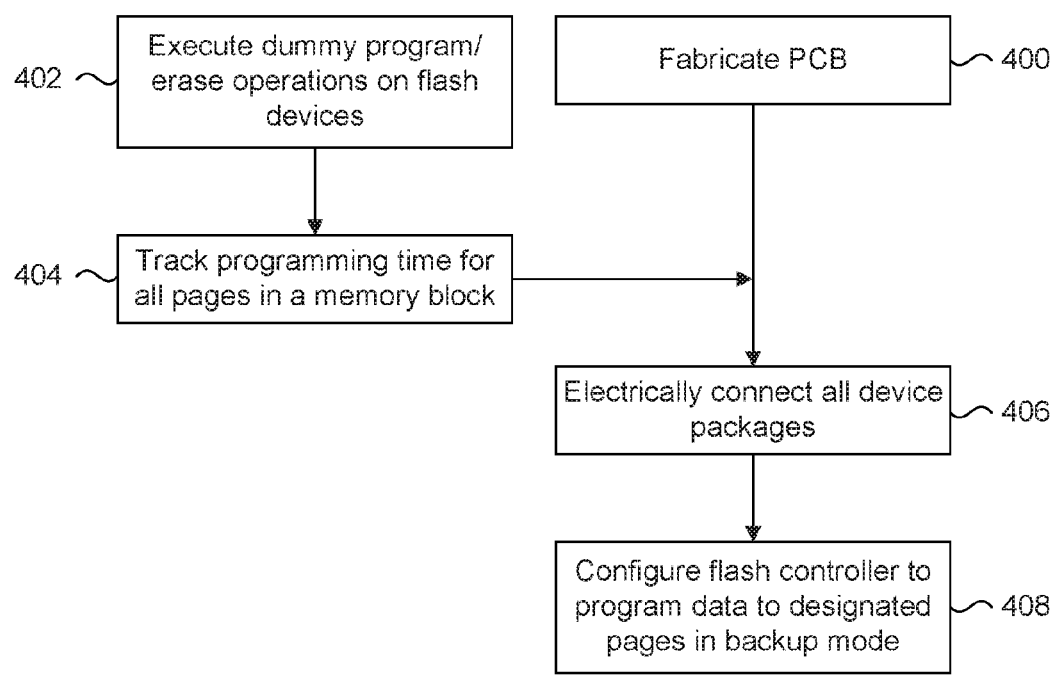
FIG. 12 is a flow chart of an alternate method for producing an NVDIMM having high speed flash memory backup capability, according to a present embodiment.

FIG. 12 is a flow chart of an alternate method for producing an NVDIMM having high speed flash memory backup capability which is similar to that of FIG. 11, according to a present embodiment. The method can start at 400 where the PCB is fabricated to include all the required conductor line traces to interconnect devices and to provide the physical interface to the host system, such as a keyed shape of the edge connector to fit within a corresponding female slot of the host system. Before, during or after 400, the operations of 402 and 404 are executed. At 402 the flash devices are pre-aged by executing dummy program/erase operations. For example, the flash devices can be inserted into testers which can operate the flash devices as if they are in normal use and operation. The tester can be configured to repeatedly program dummy data to each page of each memory block of the flash devices and then erase the memory block. This can be executed for each memory block of the flash memory device. Any data pattern can be used for programming the pages. Once again, the specific number of program/erase cycles to execute at 402 can be preset based on pre-testing of the same flash memory vendor device model, which has established worst case high speed programming times for specific logical pages. Reference is made to FIG. 8 which shows the different logical page numbers that exhibit different programming times.

At 404, the programming time for each page of the memory block which was subjected to program and erase operations is tracked. After the programming times for the pages have been determined, the mapping of pages and programming times can be recorded. Alternately, the pages of the flash memory can be tagged with additional information indicating that they can be used for programming in the specific NVDIMM application. At 406 all the packaged devices are electrically connected to the PCB, and the flash controller is configured at 408 to know which logical pages should be used for programming data in a backup operation mode based on the information obtained at 404. Alternately, if the flash device pages were tagged with the additional information, when the NVDIMM is used for the first time in the host system, the flash controller can scan the flash memory additional bits to log the pages to be used for programming as part of a boot up sequence.

Therefore, according to the previously described embodiments, an NVDIMM having pre-aged flash memory can be used to backup data faster than prior NVDIMM's, which is beneficial in situations where data must be backed up before the temporary power supply is exhausted. In the previously described examples, 4 GB of DRAM data stored on the NVDIMM needs to be programmed to the flash devices. The need for faster flash programming speed becomes more important for larger capacity NVDIMM. For example, NVDIMM capacities such as 16 GB exist, and even larger capacities may be required in the future. The cost savings provided by pre-aging of the flash devices results in direct cost savings in manufacturing of the NVDIMM. The following example is provided.

It is assumed that an NVDIMM has 16 GB of DRAM, and all 16 GB of data must be programmed to flash devices within 25 s in the event of a power supply failure. The type of flash memory which can be used is 4 GB, with 16 kB page size, and the channel speed per channel of a flash memory controller is 200 MB/s. In a prior art case where the flash devices are not pre-aged, and are new devices, the worst case programming time is 450 µs. In this prior art case, a flash controller with 5 channels and 12 flash die evenly distributed on all 5 channels is required.

In an NVDIMM having pre-aged flash devices according to the present embodiments, it is assumed the worst case programming time is 350 µs due to pre-aging for specific pages of the memory blocks. In this case, a flash controller with 4 channels and 10 flash die, with only one flash die connected to one channel. Therefore, the cost savings of 2 flash die is obtained. Furthermore, flash controllers with more channels are more costly. Therefore a less expensive flash controller can be used relative to the prior art case. A more aggressive pre-aging (more program/erase cycles) of the flash devices can result in further cost savings.

While the previous embodiments are described in the context of NVDIMM, the pre-aging of flash memory chips can be applied to other memory systems in which higher speed programming is desired or required. For example, pre-aging can be applied to flash memory chips used in other applications where data needs to be backed up. NVRAM devices can be pre-aged to provide higher speed programming capability. Similarly SSD can have some or all the specific flash chips pre-aged to provide a portion of the mass storage device with higher speed programming.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A memory system, comprising:
   a temporary power supply that provides power to the memory system for a backup time period in the event of a power outage;
   a printed circuit board having a physical interface configured for connection to a host system;
   a volatile memory device connected to the printed circuit board for receiving data from the host system via the physical interface and for providing data to the host system via the physical interface, during a first operating mode; and,
   at least one non-volatile memory device connected to the printed circuit board for receiving and programming data of the volatile memory device to memory cells of the at least one non-volatile memory device during a second operating mode in which the memory system is powered by the temporary power supply, the at least one non-volatile memory device having a plurality of dummy data program/erase cycles executed on the memory cells to program and erase test data before first time use of the at least one non-volatile memory device and before the physical interface of the printed circuit board is connected to the host system such that a worst case programming time for programming the data to the memory cells of the at least one non-volatile memory device in the second operating mode is less than the backup time period, and
   wherein a worst case programming time of the memory cells of the at least one non-volatile memory device without executing the plurality of dummy data program/erase cycles before first use is greater than the backup time period.

2. The memory system of claim 1, further including a memory controller connected to the printed circuit board and configured to receive the data of the volatile memory during the first operating mode, the memory controller providing the data to the at least one non-volatile memory device.

3. The memory system of claim 2, further including a switch circuit connected to the printed circuit board, the switch circuit being configured to
   connect the volatile memory device to the physical interface during the first operating mode, and to
   decouple the volatile memory device from the physical interface and to couple the volatile memory device to the memory controller during the second operating mode.

4. The memory system of claim 2, wherein the at least one non-volatile memory device includes at least one NAND flash memory device having memory blocks, where each memory block is configured to have programmable pages arranged from a lowest page number to a highest page number.

5. The memory system of claim 4, wherein the memory controller is configured to program data to specific pages of the at least one non-volatile memory device during the second operating mode.

6. The memory system of claim 1, wherein the volatile memory device includes at least one dynamic random access memory (DRAM) device.

7. The memory system of claim 1, wherein the at least one non-volatile memory device includes at least one flash memory device.

8. The memory system of claim 1, wherein the at least one non-volatile memory device includes at least one NAND flash memory device having memory blocks, where each memory block is configured to have programmable pages arranged from a lowest page number to a highest page number.

9. The memory system of claim 8, wherein each page is programmed with valid page data indicating pages which can be programmed during the second operating mode.

10. The memory system of claim 1, wherein the plurality of dummy program/erase cycles is an integer number resulting in a worst case programming time of the at least one non-volatile memory device of less than 350 µs.

11. The memory system of claim 1, wherein the plurality of dummy program/erase cycles is an integer number resulting in a worst case programming time of the at least one non-volatile memory device of less than 300 µs.

12. The memory system of claim 1, wherein the plurality of dummy program/erase cycles is an integer number resulting in a worst case programming time of the at least one non-volatile memory device of less than 250 µs.

13. The memory system of claim 1, wherein the plurality of dummy program/erase cycles is an integer number resulting in a worst case programming time of the at least one non-volatile memory device of less than 200 µs.

14. The memory system of claim 1, wherein the plurality of dummy program/erase cycles is an integer number resulting in a worst case programming time of the at least one non-volatile memory device of less than 150 µs.

15. The memory system of claim 1, wherein the memory cells are in pages and the plurality of dummy data program/erase cycles are executed on a subset of all pages of the at least one non-volatile memory device.

16. The memory system of claim 15, wherein the data of the volatile memory device are programmed to the pages of the subset of all the pages in the second operating mode.

17. A method for producing a memory system, comprising:
   providing a temporary power supply that provides power to the memory system for a backup time period in the event of a power outage;
   providing a printed circuit board having a physical interface configured for connection to a host system;
   connecting at least one volatile memory device to the printed circuit board for receiving data from the host system via the physical interface and for providing data to the host system via the physical interface, during a first operating mode;
   connecting at least one non-volatile memory device to the printed circuit board for receiving and programming data of the volatile memory device to memory cells of the at least one non-volatile memory device during a second operating mode in which the memory system is powered by the temporary power supply;
   executing a plurality of dummy data program/erase cycles to program and erase test data on pages of the at least one non-volatile memory device before first time use of the at least one non-volatile memory device and before the physical interface of the printed circuit board is connected to the host system such that a worst case programming time for programming the data to the memory cells of the at least one non-volatile memory device in the second operating mode is less than the backup time period, and wherein a worst case programming time of the memory cells of the at least one non-volatile memory device without executing the plurality of dummy data program/erase cycles before first use is greater than the backup time period; and configuring a controller to program data to the pages.

18. The method of claim 17, wherein the plurality of dummy data program/erase cycles is an integer number resulting in a worst case programming time of the at least one non-volatile memory device of less than 350 µs.

19. The method of claim 17, wherein the at least one non-volatile memory device includes at least one NAND flash memory device each having memory blocks, where each memory block is configured to have programmable pages arranged from a lowest page number to a highest page number.

20. The method of claim 19, wherein the executing includes tracking programming time after each dummy data program/erase cycle.

21. The method of claim 20, wherein the tracking includes tracking programming times for each programmable page of each memory block.

22. The method of claim 21, further including tagging each page having a programming time faster than a predetermined time with valid page data information.

23. The method of claim 21, further including configuring a memory controller with addresses of pages having a programming time faster than a predetermined time.

24. The method of claim 17, wherein the pages of the at least one non-volatile memory device are a subset of all pages of the at least one non-volatile memory device.

25. The method of claim 24, wherein step of executing includes tracking programming times of each page of the subset of all the pages.

26. The method of claim 25, further including configuring a memory controller to program the data of the volatile memory device to the pages of the subset of all the pages during the second operating mode.

27. The method of claim 26, wherein the pages of the subset of all the pages are in a memory block of each of the at least one non-volatile memory device.

\* \* \* \* \*